United States Patent
Lichtenwalter et al.

[15] 3,692,789
[45] Sept. 19, 1972

[54] METHOD FOR PREPARATION OF AMINOETHYLPIPERAZINE

[72] Inventors: Myrl Lichtenwalter; Ernest Leon Yeakey, both of Austin, Tex.

[73] Assignee: Jefferson Chemical Company, Inc., Houston, Tex.

[22] Filed: Oct. 24, 1969

[21] Appl. No.: 869,345

[52] U.S. Cl. ....260/268 SY, 260/268 BC, 260/268 T
[51] Int. Cl. ...............................................C07d 51/64
[58] Field of Search ......................260/268 SY, 268 T

[56] References Cited

UNITED STATES PATENTS

| | | |
|---|---|---|
| 3,597,483 | 8/1971 | Haanen................260/268 SY |
| 2,861,995 | 11/1958 | Mackenzie................260/268 |
| 3,152,998 | 10/1964 | Moss......................260/268 X |
| 3,285,920 | 11/1966 | Muhlbauer et al. ........260/268 |
| 3,297,700 | 1/1967 | Muhlbauer et al. ........260/268 |

*Primary Examiner*—Donald G. Daus
*Attorney*—John R. Kirk, Jr. and H. G. Jackson

[57] ABSTRACT

This invention relates to a method for the preparation of an amine, namely, 1-(2-aminoethyl)piperazine from a mixture of N-(hydroxyethyl)diethylene triamine isomers formed by the reaction of ethylene oxide with diethylenetriamine. Aminoethylpiperazine is a useful curing agent for epoxy resins and may also be used as a chemical intermediate (e.g., for the preparation of triethylenediamine).

4 Claims, No Drawings

METHOD FOR PREPARATION OF AMINOETHYLPIPERAZINE

BACKGROUND OF THE INVENTION

1. Field of the Invention

In general, the invention is concerned with the conversion of an open-chain polyamine compound to N-aminoethylpiperazine. Although aminoethylpiperazine is formed as a by-product in the synthesis of piperazine and in the synthesis of ethylenediamine, there is a need for a direct method of synthesis for the product.

2. Description of the Prior Art

The knowledge of the art with respect to the conversion of aliphatic polyamines is largely empirical. For example, deamination reactions are notorious for their poor selectivity due to the many possible side reactions that can occur. This is particularly true when it is attempted to form a heterocyclic piperazine type compound from an ethylene polyamine. Thus, ring closure can be effected with ethylene polyamines in the presence of hydrogenation catalysts only under comparatively severe operating conditions. While severe operating conditions do promote cyclization, they also promote cracking and condensation reactions whereby a wide variety of products are normally formed. Moreover, since the reaction mechanisms are not fully understood, the synthesis of piperazine type compounds has remained largely an empirical art.

The fact that cracking reactions tend to predominate when ethylene polyamines are treated under conditions severe enough to promote ring closure is shown, for example, by Kyrides U.S. Pat. No. 2,267,686, wherein it is suggested that ethylenediamine, diethylenetriamine, triethylenetetramine or tetraethylenepentamine are all suitable feed stocks for the preparation of piperazine (apparently due to the susceptibility of the higher polyethylene polyamines to cracking).

Speranza et al. U.S. Pat. No. 3,055,901 discloses a method for making aminoethylpiperazine from triethylenetetramine, which may be illustrated schematically as follows:

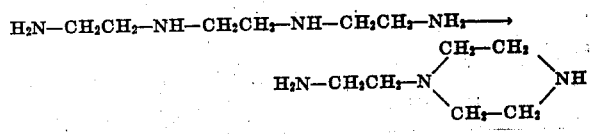

Kermack and Smith (J. Chem. Soc., 1931, 3096) reported the preparation of aminoethylpiperazine by a route illustrated by the reaction below:

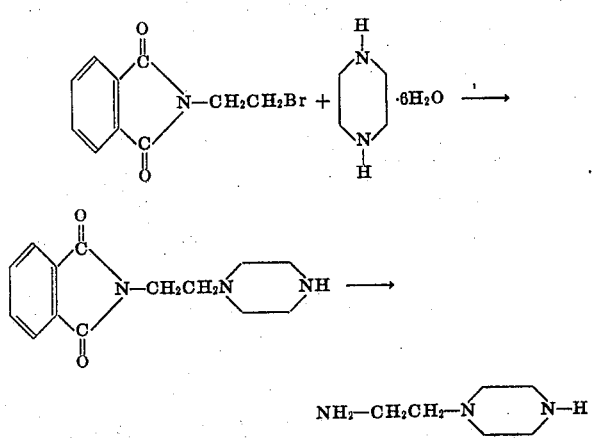

Another preparation by van Alphin (Rec. Trav. Chem., 56,1007,1937) has been described:

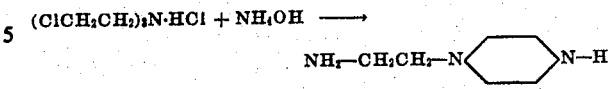

These approaches leave much to be desired.

SUMMARY OF THE INVENTION

In contrast to the foregoing, it has been discovered that excellent yields of aminoethylpiperazine can be prepared from N-(hydroxyethyl)diethylenetriamines such as those prepared by reacting ethylene oxide with diethylenetriamine. This is particularly surprising because the ethoxylation reaction is not selective. Thus, the reaction may be schematically illustrated as follows:

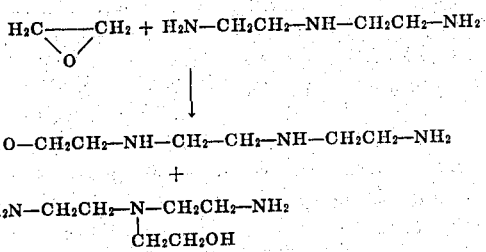

Since it is necessary to both aminate and cyclize these structurally different isomers simultaneously, and since they are reactive with each other, with aminoethylpiperazine and with other reaction mixture components, it is surprising that conditions could be found which would provide for the significant production of aminoethylpiperazine from the mixed isomers.

DESCRIPTION OF THE PREFERRED EMBODIMENTS

Briefly, in accordance with the present invention a N-(hydroxyethyl)diethylenetriamine is brought into contact with a hydrogenation catalyst, as hereinafter defined, at a temperature within the range of about 100° C. to about 300° C. (and more preferably within the range of about 140° to 200° C.), and a pressure within the range of about 500 to about 15,000 psig (and more preferably within the range of about 1,800 to about 5,000 psig) and in the presence or absence of, but preferably in the presence of, one or more of water, ammonia, and hydrogen to provide a reaction product containing aminoethylpiperazine as a major component of the reaction and by recovering aminoethylpiperazine from the product of the reaction by any suitable means, such as distillation.

For best results, the reaction is conducted in the presence of added hydrogen which may suitably be added in an amount such that the reaction is conducted in the presence of from about 10 to about 200 atmospheres of hydrogen and, more preferably, from about 10 to about 100 atmospheres of hydrogen. It is desirable to employ added ammonia and when ammonia is employed, it is preferable to employ from about 1 to about 10 mols of ammonia per mol of N-(hydroxyethyl)diethylenetriamine. In general, it is more preferable to utilize a molar excess of ammonia such as a molar ratio of from about 2 to about 4 mols of ammonia per mol of N-(hydroxyethyl)diethylenetriamine.

When added water is to be employed, it will preferably be employed in an amount within the range of about 5 to 100 wt. percent, based on the total weight of the non-aqueous charge materials.

The catalysts to be used in accordance with the present invention are catalysts consisting essentially of from about 60 to about 100 wt. percent of cobalt or nickel or mixtures thereof and from about 0 to about 40 wt. percent of a promoter of copper, copper oxide, chromium oxide, manganese oxide, molybdenum oxide or thorium oxide or mixtures thereof. It is within the scope of the present invention to utilize unsupported catalysts of the above description or to employ a catalyst of the above description which is supported on an inert support such as gamma alumina, kieselguhr, etc.

A preferred group of catalysts from the class described includes Raney nickel, Raney cobalt, a catalyst consisting of a mixture of about 60 to 80 wt. percent nickel, 30 to 15 wt percent copper and about 1 to 10 wt. percent chromium oxide, or a catalyst consisting of about 60 to 80 wt. percent cobalt, 30 to 15 wt. percent copper and about 1 to 10 wt.% chromium oxide.

For best results it is desirable to utilize a contact time within the range of about 0.5 to about 2 hours and, more preferably, a contact time of about 0.8 to about 1.5 hours.

The invention will be further illustrated by the following specific examples which are given by way of illustration and not as limitations on the scope of this invention. Where parts are mentioned, they are parts by weight.

EXAMPLE I

The reaction was carried out in a continuous reactor. The reactor was a stainless steel tube of 1-¼ inch diameter and 12.5 inches in length which held 250 ml. of pelleted cobalt-copper-chromium catalyst.

Hydrogen (78 l/hr. measured at 0° C. and 1 atm.), ammonia (0.13 lb./hr.), and a distilled mixture of isomers of N-(hydroxyethyl)diethylenetriamine (0.38 lb./hr. of a 50 percent aqueous solution) were metered into the reactor which was operated at 155°–165° C. and 3,000 psig pressure. The crude effluent of a run, in which 3.54 kg. of 50 percent aqueous N-(hydroxgethyl)diethylenetriamine was passed through the reactor, was distilled to yield 919 g. of aminoethylpiperazine, b.p. 93°–95° C. (10 mm.). The yield was 59 percent of theory.

EXAMPLE II

When a nickel-copper-chromium hydrogenation-dehydrogenation catalyst was substituted for the catalyst in Example I, a 52 percent yield (499 g.) of aminoethylpiperazine was obtained by passing 2.68 kg. of 50 percent aqueous N-(hydroxyethyl)-diethylenetriamine over the catalyst. The reactor was operated at 155°–165° C. and 3,000 psig pressure and the feed rates of the reactants were the same as in Example I.

EXAMPLE III

A 50 percent aqueous solution of mixed isomer of N-(hydroxyethyl)diethylenetriamine containing 15–25% N,N'-di(hydroxyethyl)diethylenetriamine was passed over the catalyst described in Example I using the same feed rates and reactor conditions as in Example I. The yield of aminoethylpiperazine was 51 percent.

We claim:

1. A method for preparing aminoethylpiperazine which consists essentially of contacting a N-(hydroxyethyl)diethylenetriamine with a hydrogenation catalyst consisting essentially of from about 60 to about 100 wt. percent of cobalt or nickel or mixtures thereof, and from about 0 to about 40 wt. percent of a promoter of copper, copper oxide, chromium oxide, manganese oxide, molybdenum oxide or thorium oxide or mixtures thereof; and from about 1 to 10 mols of ammonia per mol of N-(hydroxyethyl)diethylenetriamine under reaction conditions including a temperature within the range of about 100° C. to about 300° C. and a pressure within the range of about 500 to about 15,000 psig to form a reaction mixture containing aminoethylpiperazine as the principal product of the reaction and recovering said aminoethylpiperazine from said reaction product.

2. A method for preparing aminoethylpiperazine which consists essentially of contacting a N-(hydroxyethyl)diethylenetriamine with a hydrogenation catalyst consisting essentially of from about 60 to about 100 wt. percent of cobalt or nickel, or mixtures thereof, and from about 0 to about 40 wt. percent of a promoter of copper, copper oxide, chromium oxide, manganese oxide, molybdenum oxide or thorium oxide, or mixtures thereof for a period of time within the range of about 0.8 to 1.5 hours in the presence of about 1 to 4 mols of ammonia per mol of N-(hydroxyethyl)diethylenetriamine under reaction conditions including a temperature within the range of about 150° C. to about 250° C. and a pressure within the range of about 1,800 to about 3,000 psig and a hydrogen partial pressure within the range of about 10 to about 100 atmospheres, to form a reaction mixture containing aminoethylpiperazine as a principal product of the reaction and recovering said aminoethylpiperazine from said reaction product.

3. A method as in claim 2 wherein the catalyst consists of a mixture of 60 to 80 wt. percent cobalt, 30 to 15 wt. percent copper and about 1 to 10 wt. percent chromium oxide.

4. A method as in claim 3 wherein the feed stock is a mixture of N-(hydroxyethyl)diethylenetriamines prepared by reacting ethylene oxide with diethylenetriamine.

* * * * *